Dec. 13, 1966     B. R. SILVER     3,290,744
SNAP FASTENER COMPONENT
Filed Oct. 28, 1964
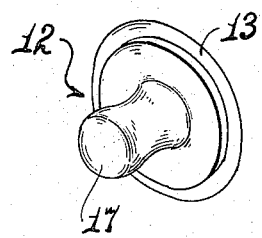
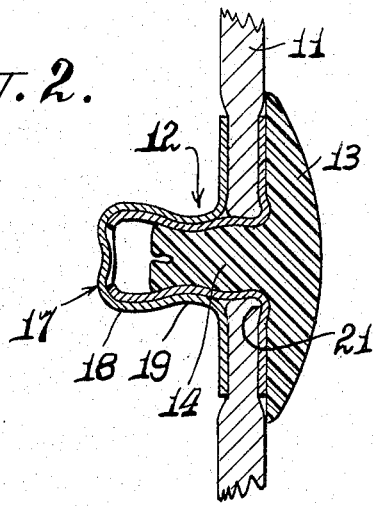
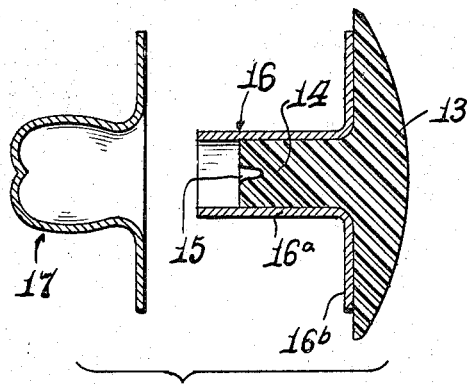
INVENTOR.
Bernard R. Silver
BY Elmer L. Zwickel
Attorney.

United States Patent Office 3,290,744
Patented Dec. 13, 1966

3,290,744
SNAP FASTENER COMPONENT
Bernard R. Silver, Providence, R.I., assignor to Rau Fastener Company, Providence, R.I., a corporation of Rhode Island
Filed Oct. 28, 1964, Ser. No. 407,007
8 Claims. (Cl. 24—90.5)

This invention relates to improvements in the construction and assembly of snap fastener components and to their method of assembly, and is more particularly concerned with a snap fastener stud assembly.

More specifically, the invention is concerned with a laundry-proof type of snap fastener component of a kind having a natural or synthetic pearl button-like front and an eyelet projecting from one face thereof for insertion through an opening in a piece of sheet material and to receive thereon a stud part which secures the assembly firmly in place on the sheet material.

In the attachment of a non-metallic button-like front comprised for example of plastic, glass stone or like material, to a snap fastener stud part it has been customary to embed an eyelet in the material of the button-like front or to mount the button-like front on an eyelet having a base flange carrying a peripheral channelled rim in which the button-like front is seated. The construction and assembly of fastener components in either foregoing manner is costly and difficult and those having a peripheral rim are not aesthetically correct. Further, assemblies having the eyelet embedded in the bottom of the button-like front often tend to separate under applied stress when in use.

The present invention comprises a novel method and means of assembly wherein there is no unsightly peripheral rim on the finished article and the eyelet is permanently bonded to the button-like front. In order to accomplish these desired results the button-like front is formed with an integral shank which is press-fitted, under moderate compressive load, into the barrel of an eyelet. This sub-assembly is then associated, after being mounted in place on a sheet of material, with a stud part, the latter being press-fitted and formed over the barrel of the eyelet in a conventional manner. Securement of the stud part functions to deform or compress the barrel sufficiently to cause it to embrace the shank so tightly as to resist all efforts to separate the parts without part destruction.

It is therefore an object of the invention to provide a novel snap fastener component.

Another object is to provide a rimless button-like snap fastener component with a novelly attached stud part.

Another object is to provide a plastic button-like front with novel means to receive and retain thereon a stud part.

Another object is to provide a button-like front with a stud part adapted to be press-fitted securely on the button-like front.

Another object is to provide a button-like stud assembly that is not expensive or difficult to manufacture, is very efficient in use and is easy to install by the use of conventional machinery.

The structure and method by means of which the above noted and other advantages and objects of the invention are attained will be described in the following specification, taken in conjunction with the accompanying drawings, showing a preferred illustrative embodiment of the invention, in which:

FIG. 1 is a perspective view of a snap fastener stud component embodying the invention.

FIG. 2 is an enlarged diametrical sectional view of the component shown in FIG. 1.

FIG. 3 is an exploded view of the parts before final assembly on a sheet of material.

Referring to the exemplary disclosure of the invention shown in the accompanying drawings, a sheet of supporting material 11, or other carrying medium, such as a garment, is adapted to have a snap fastener component, such as the stud element 12, attached firmly thereto and arranged to cooperate with a conventional snap fastener socket component, not shown.

The stud component 12 includes a button-like front 13 which, in this instance, is fabricated from suitable plastic material or which may be natural or synthetic pearl. Projecting from the bottom face of the front 13 and formed integral with it is a round shank 14 of uniform diameter throughout its length and preferably being slightly recessed axially, as at 15, on its free end.

In the assembly of the parts, an eyelet 16 has its barrel 16a telescoped snugly over shank 14 so as to locate its base flange 16b in surface contact with the bottom face of the button-like front. The shank 14 with the eyelet 16 thereon then is passed through an opening in the sheet material 11. This opening may be preformed or it may be formed by driving the shank-eyelet assembly through the material. In either event, a tubular stud part 17 is positioned over the projecting end of the shank-eyelet assembly. This stud part is then subjected to the function of a tool that presses it firmly over the barrel of the eyelet and spins or otherwise compresses the tubular portion of the stud part tightly about the shank-eyelet assembly so as to define head 18 and a reduced diameter neck 19. When the neck 19 is formed in the stud part the barrel 16a of the eyelet is compressed and deformed in the area underlying the neck so as to engage tightly about the shank 14. Also, the base of the barrel 16a, that is where it merges with flange 16b, is pressed tightly about the base of the shank against the bottom face of the front 13, as indicated at 21.

This assembly effects a mechanical bond between the three assembled parts. As a consequence the stud part 17 is secured firmly to the eyelet barrel 16a and the eyelet barrel is secured firmly to the shank 14. Thus, when a fastener stud element constructed as described is separated from an associated socket, the pulling stress placed on the material 11 is transmitted directly to the eyelet flange 16b and not on the button-like front 13. Further, because the eyelet barrel 16a has a length slightly greater than the length of shank 14, the sub-assembly has the full piercing capabilities inherent in an eyelet.

Although I have described a preferred embodiment of my invention in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

I claim:

1. A snap fastener stud element assembly comprising a button-like front of fragile material, a shank integral with and projecting normal to the plane of the back surface of said front, an eyelet including a barrel telescoped over said shank, a tubular stud part telescoped over said barrel, said stud part having a neck of lesser diameter than the outside diameter of the barrel so as to compress the barrel tightly about the shank for securing the parts together.

2. The snap fastener stud element recited in claim 1, in which the barrel is embedded partially in the shank.

3. The snap fastener stud element recited in claim 1, in which the shank is of the same material as the button-like front.

4. A snap fastener stud element assembly comprising a button-like front fabricated from plastic material, a substantially solid shank of like material integral with and projecting normal to the plane of the back face of said front, an eyelet including a tubular barrel telescoped over said shank, a flange on said eyelet seated against the back face of said front to reinforce the latter, a tubular stud part telescoped over the barrel, and said stud part having an annular recess for securing said stud part to the barrel and compressing said barrel tightly about the shank.

5. The snap fastener stud element recited in claim 4, in which the annular recess is inwardly of the free end of said stud to define a head on said free end.

6. A snap fastener stud element assembly comprising a button-like front, a substantially solid shank integral with and projecting from one surface of said front, an eyelet including a tubular barrel telescoped over said shank, a flange on said eyelet seated against the said surface to reinforce the button-like front, a tubular stud part telescoped over said barrel, a base flange on one end of said stud part and a head at its other end, said stud part and barrel being of reduced diameter in like areas between the stud head and stud flange so as to bind the stud part to the barrel and the barrel to the shank.

7. The snap fastener element recited in claim 6, in which a mounting sheet is arranged between said flanges.

8. The method of mounting a snap fastener stud element on a supporting sheet which comprises, telescoping a tubular eyelet over a shank of a button-like front member, projecting said eyelet and shank through the material, placing a tubular stud part over the projecting end of said eyelet and shank, and contracting the tubular stud part inwardly of its free end circumferentially to deform the tubular eyelet and bind it tightly onto said shank.

References Cited by the Examiner

UNITED STATES PATENTS

| | | | |
|---|---|---|---|
| 1,904,122 | 4/1933 | Chapman | 24—217 |
| 2,723,433 | 11/1955 | Van Buren | 24—90 |
| 2,986,790 | 6/1961 | Silver et al. | 24—95 |
| 3,176,365 | 4/1965 | Carpinella | 24—219 |

FOREIGN PATENTS 395    1868    Great Britain.

WILLIAM FELDMAN, *Primary Examiner.*

DONALD A. GRIFFIN, *Examiner.*